(12) United States Patent
Wild et al.

(10) Patent No.: US 7,690,706 B2
(45) Date of Patent: Apr. 6, 2010

(54) GRIPPER DEVICE

(75) Inventors: Hans-Peter Wild, Eppelheim (DE);
Eberhard Kraft, Neckarbischofsheim (DE); Frank Lechert, Weinheim (DE)

(73) Assignee: Indag Gesellschaft fur Industriebedarf mbH & Co Betriebs, Eppelheim (DE)

( * ) Notice: Subject to any disclaimer, the term of this patent is extended or adjusted under 35 U.S.C. 154(b) by 156 days.

(21) Appl. No.: 11/782,500

(22) Filed: Jul. 24, 2007

(65) Prior Publication Data

US 2008/0031717 A1 Feb. 7, 2008

(30) Foreign Application Priority Data

Jul. 26, 2006 (EP) .................. 06015627

(51) Int. Cl.
*B65G 47/26* (2006.01)
*B25J 15/06* (2006.01)

(52) U.S. Cl. .................. 294/65; 294/87.1; 198/468.3

(58) Field of Classification Search ............. 294/64.1, 294/65, 87.1; 414/416.02, 627, 737, 754; 198/468.3, 468.4
See application file for complete search history.

(56) References Cited

U.S. PATENT DOCUMENTS

| | | | |
|---|---|---|---|
| 3,302,967 A * | 2/1967 | Harris et al. ................... 294/65 |
| 3,506,140 A | 4/1970 | Koch et al. | |
| 3,860,280 A | 1/1975 | Karlsson | |
| 3,929,234 A | 12/1975 | Warren | |
| 4,444,423 A * | 4/1984 | Montferme et al. ......... 294/87.1 |
| 4,832,180 A * | 5/1989 | Ferrero .................... 198/468.3 |
| 5,575,376 A * | 11/1996 | Colamussi ............... 198/468.3 |
| 5,839,769 A * | 11/1998 | Slocum et al. ............. 294/87.1 |
| 6,068,317 A * | 5/2000 | Park .......................... 294/87.1 |
| 6,439,631 B1* | 8/2002 | Kress .......................... 294/65 |
| 7,234,744 B2* | 6/2007 | Osten et al. ................... 294/65 |

FOREIGN PATENT DOCUMENTS

| | | |
|---|---|---|
| JP | 06-048564 | 2/1994 |
| JP | 06-262572 | 9/1994 |
| JP | 09-118432 | 5/1997 |

OTHER PUBLICATIONS

European Patent Office Search Report, dated Jan. 19, 2007, in patent appln. No. EP 06015627.0.

* cited by examiner

*Primary Examiner*—Dean J Kramer
(74) *Attorney, Agent, or Firm*—Stroock & Stroock & Lavan LLP

(57) ABSTRACT

An apparatus for transporting objects may include a plurality of grippers having a first spacing at a first position and second spacing at a second position. A drive mechanism may be provided is for selectively displacing the grippers from the first position to the second position to adjust the spacing between the grippers.

5 Claims, 3 Drawing Sheets

US 7,690,706 B2

GRIPPER DEVICE

BACKGROUND OF THE INVENTION

This invention relates, in general, to an apparatus and method for transporting products, for example, for use with a conveying and processing system.

Most transporting systems currently available include a plurality of grippers, such as suction heads, that are moved simultaneously with a frame to which the grippers are connected. The grippers are often lowered onto the products to be picked up and raised with the products and moved to another location. In such systems, the spacing of the grippers is matched to the spacing of the products to assure proper operation. An apparatus for allowing the spacing between the products to be reduced or increased would be desired.

In light of the shortcomings described above, it is desirable to provide an apparatus and system for transporting products that facilitates reducing or increasing the spacing of products being transported.

SUMMARY

Generally speaking, the present invention is directed toward an apparatus wherein the spacing between grippers can be adjusted according to the spacing between products being transported. More specifically, an embodiment of the invention is particularly suitable for high speed conveying, such as the conveying of filled drink pouches or similar products.

Accordingly, it is an object of the invention to provide an apparatus and system for transporting products along a conveyor belt, wherein the spacing between grippers can be reduced or increased according to the spacing between the products being conveyed.

Other objects and features of the present invention will become apparent from the following detailed description, considered in conjunction with the accompanying drawing figure. It is to be understood, however, that the drawings are designed solely for the purpose of illustration and not as a definition of the limits of the invention, for which reference should be made to the appended claims.

BRIEF DESCRIPTION OF THE FIGURES

For a fuller understanding of the invention, reference is had to the following description, taken in connection with the accompanying drawings, in which.

DETAILED DESCRIPTION

Figure 1:
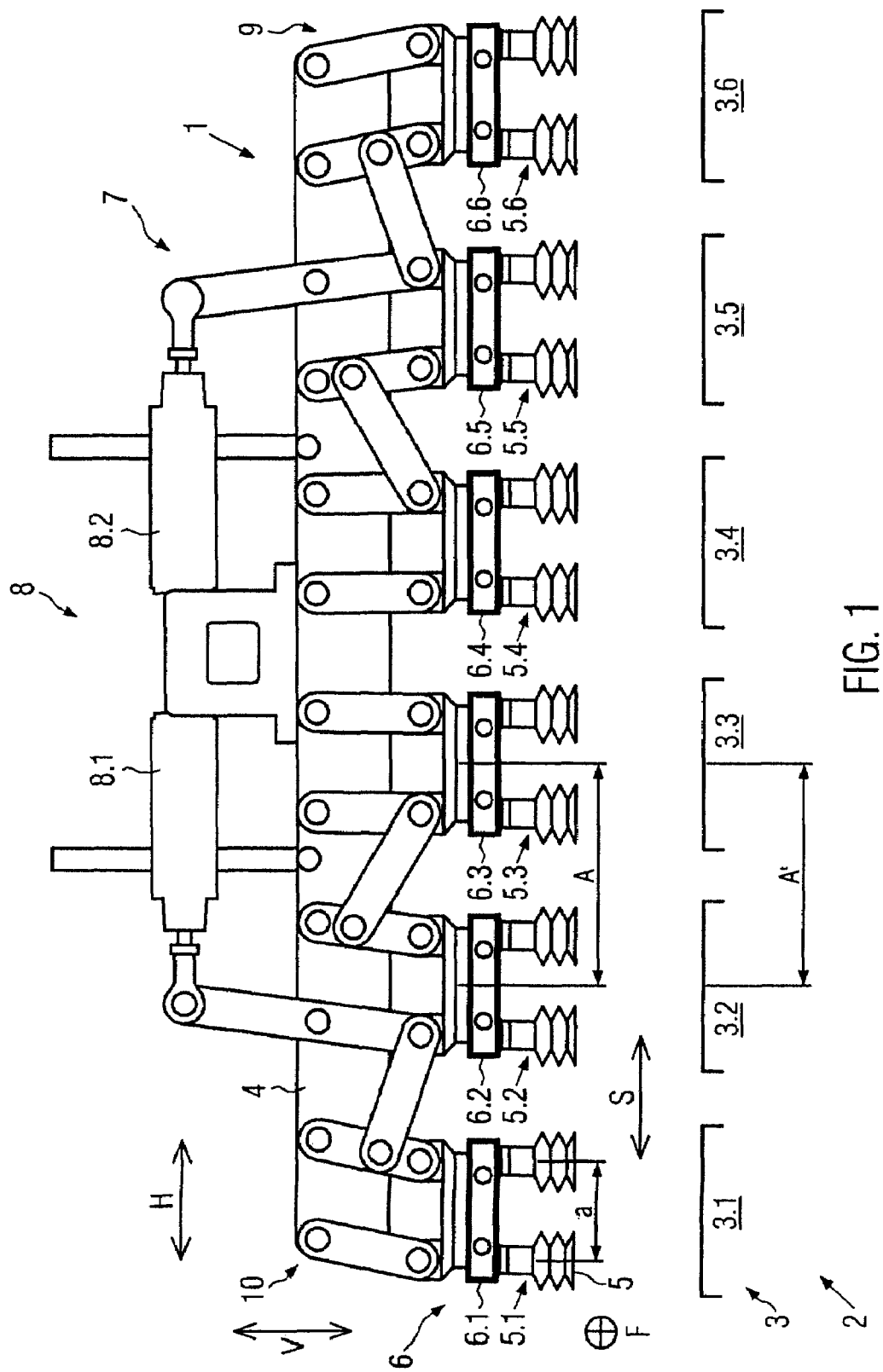
FIG. 1 is a front elevational view of an apparatus in accordance with an embodiment of the invention in a first position.
Figure 2:
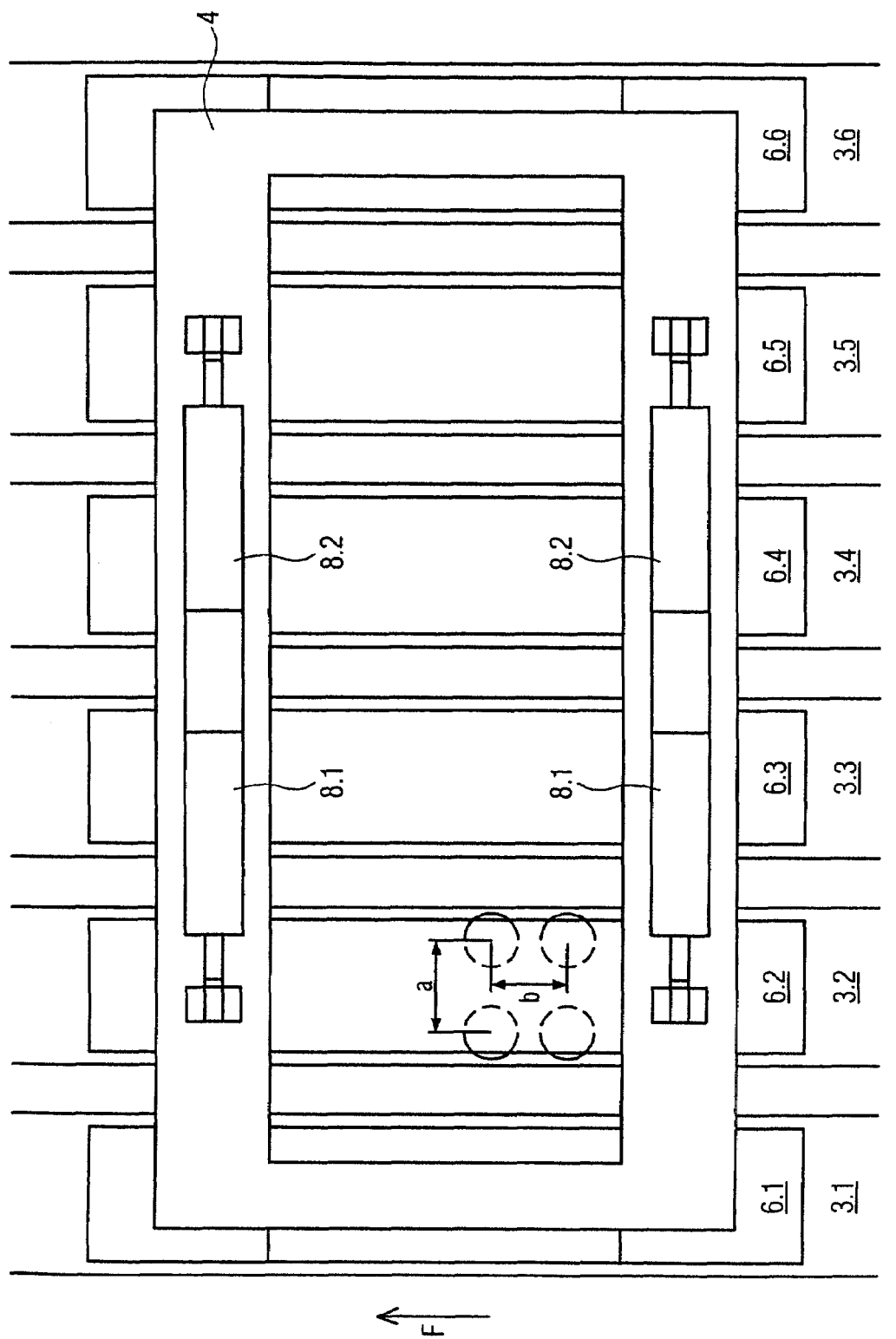
FIG. 2 is a top plan view of the apparatus of FIG. 1.
Figure 3:
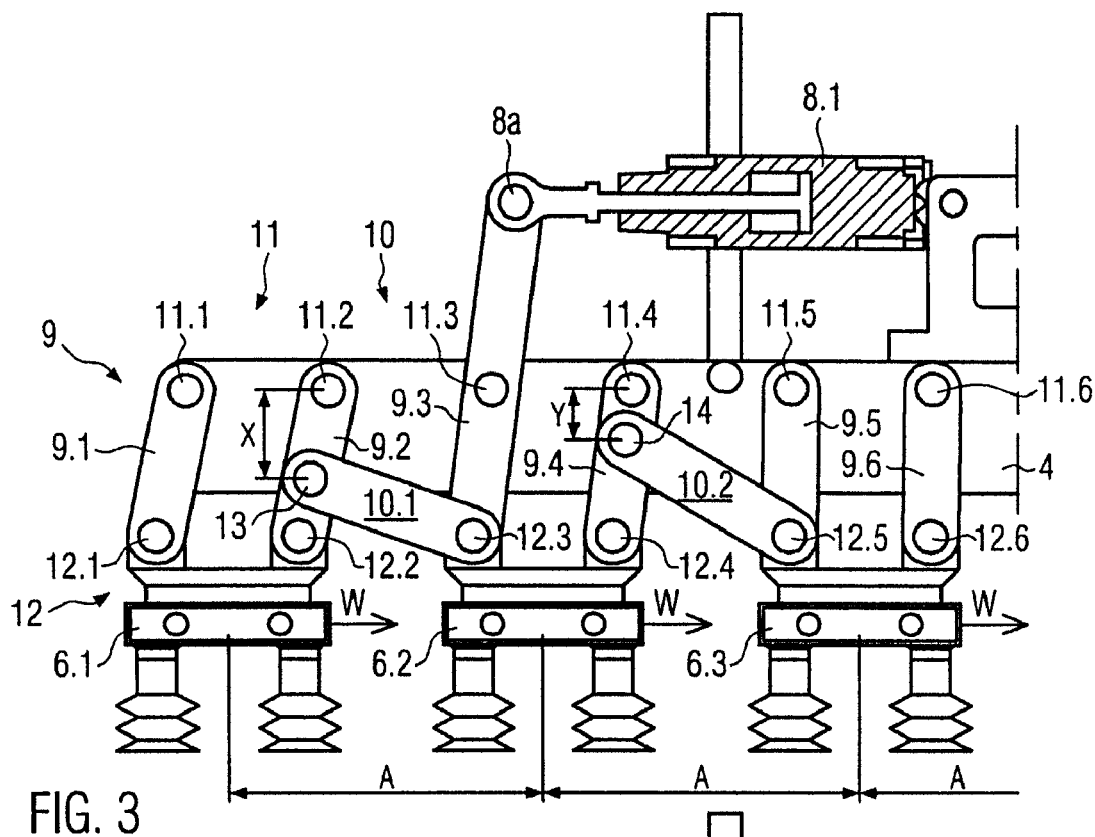
FIG. 3 is an expanded view of section A in a first position.

Reference is made to FIGS. 1-3, wherein a gripper device 1 is illustrated with a conveyor system 2. It is to be understood that gripper device 1 can comprise a part of a production machine and the like without deviating from the scope of the invention.

In the embodiment shown, conveyor system 2 is suitable for high-speed transport of objects such as packaging for food, for example, filled plastic pouches. An example of an object being transported includes a stand-up pouch for drinks.

The gripper device 1 is preferably suitable for removing the objects from the conveying system 2 and depositing them elsewhere, for example, in an outer packaging.

Referring to FIGS. 1-2, conveying system 2 can include a number of conveyor lanes 3. In the embodiment shown, conveying system 2 has six conveyor lanes 3.1 to 3.6. Conveyor lanes 3 can be conveyor belts on which the objects are transported. The conveyor lanes 3 can be driven in a conveying direction F.

In accordance with a preferred embodiment, gripper device 1 is positioned above the conveyor lanes 3. Gripper device 1 preferably is movable in direction H to transport the objects away from the conveyor system 2. Preferably, direction H is transverse or longitudinal with respect to the conveying direction F, for example, to deposit the objects at a location outside conveyor lanes 3. Gripper device 1 can include a frame 4 having a plurality of grippers 5. Grippers 5 are preferably arranged on a common plane. Whereas the embodiment illustrated in FIG. 1 shows twelve grippers 5 on frame 4, it is to be understood that the number of grippers can be varied in accordance with application specific design choice, without deviating from the scope of the invention.

Gripper device 1 is preferably constructed and arranged to permit grippers 5 to be selectively movable in direction V, preferably substantially vertically, such that grippers 5 can be lowered onto the objects on the conveyor lanes 3, and raised from the conveyor lanes 3, either with or without the objects. Preferably, the movement in direction V can be executed by a single gripper 5, the frame 4, or both.

An example of preferred grippers 5 are suction heads. Grippers 5 are preferably pneumatically actuated, whereas different manners of actuating the grippers 5 are contemplated herein.

Referring to FIG. 1, grippers 5 are referenced in groups 5.1 to 5.6 for convenience herein. In the embodiment shown in FIGS. 1-3, gripper groups 5.1 to 5.6 are connected to carriers 6.1 to 6.6, respectively, wherein each gripper group 5.1 to 5.6 is connected to a single carrier 6.1 to 6.6 and vice versa. Preferably the number of carriers 6 and gripper groups 5 correspond to the number of conveyor lanes 3. The carriers 6.1 to 6.6 preferably extend in the direction of and essentially parallel to the conveyor lanes 3.1 to 3.6. In the embodiment shown, one carrier 6.1 to 6.6 is arranged parallel to and above one conveyor lane 3.1 to 3.6, respectively.

Gripper group 5.1 to 5.6 each preferably includes a plurality of grippers 5. In the embodiment illustrated in FIG. 2, each gripper group 5.1 to 5.6 includes four grippers 5, positioned in two rows one behind the other in the conveying direction F of the conveyor lanes 3. Preferably, grippers 5 are connected to carriers 6 and positioned opposite one another in pairs and arranged with predefined spacings a, b with respect to one another, as shown in FIG. 2. As referred to herein, spacing represents the distance between the centers of two objects. Referring to FIG. 2, the two rows of grippers are positioned with a fixed spacing b in between the rows, and the two grippers 5 on the same row are positioned with a fixed spacing a between the grippers 5. Preferably, the spacing of the grippers 5 of each of the gripper groups 5.1 to 5.6 are equivalent.

Referring to FIGS. 1-2, one gripper group 5.1 to 5.6 of grippers 5 can correspond to one conveyor lane 3.1 to 3.6 of the conveying system 2, wherein one carrier 6.1 to 6.6 includes all the grippers 5 corresponding to one conveyor lane 3. For example, referring to FIGS. 1-2, conveyor lane 3.1 has gripper group 5.1 connected to carrier 6.1. In the embodiment shown, no gripper 5 other than the grippers 5 of gripper group 5.1 is constructed and arranged to remove objects from conveyor lane 3.1. It is to be understood that the number of conveyor lanes 3, gripper groups 5.1 to 5.6, carriers 6, gripper groups 5 per conveyor lane 3 or carrier 6, carriers 6 per conveyor lane 3, grippers 5 per gripper group 5.1 to 5.6, their respective arrangements and the like can be varied without deviating from the scope of the invention as a matter of application specific design choice, for example, depending on the objects being transported. In accordance with one exemplary embodiment, each gripper group 5.1 to 5.6 can include a single gripper 5.

Reference is made to FIG. 1, wherein a spacing A is provided between adjacent gripper groups 5.2 and 5.3 or carriers 6.2 and 6.3 in accordance with an exemplary embodiment of the invention. Spacing A can be provided in a direction transverse to the conveying direction F. Preferably spacing A is provided between each pair of adjacent gripper groups 5.1 to 5.6 and/or carriers 6.1 to 6.6. Referring to FIG. 1, spacing A is preferably equivalent to spacing A' of the conveyor lanes 3 such that each group 5.1 to 5.6 is centered above the corresponding conveyor lane 3.1 to 3.6. Grippers 5 can preferably contact the objects on the corresponding conveyor lane 3.1 to 3.6 without obstruction or constraint when grippers 5 are lowered along direction V toward the conveyor lanes 3.

Figure 4:
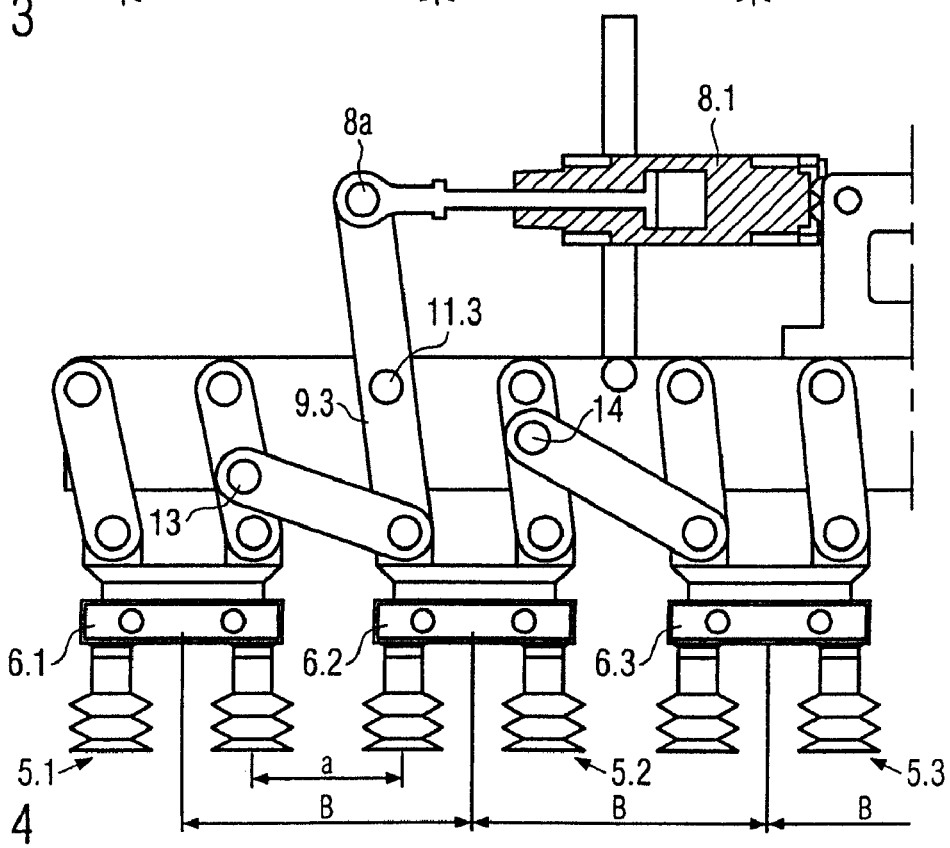
FIG. 4 is an expanded view of section A in a second position.

In accordance with an exemplary embodiment of the gripper device 1, the spacing between the gripper groups 5.1 to 5.6 arranged transverse to the conveying direction F can be altered. For example, activating a drive 7 can result in grippers 5 being moved relative to the frame 4 such that the spacing between gripper groups 5.1 to 5.6 are reduced or increased. Referring to FIGS. 3-4, the change in spacing between the gripper groups 5.1 to 5.6 can result from at least partially mechanically operating drive 7.

Drive 7 can include cylinders 8, for example, pneumatic cylinders, and can further include a mechanical transfer joint 9 preferably located on each carrier 6. Transfer joint 9 can be used to move gripper groups 5.1 to 5.6 or the carriers 6.1 to 6.6 to move toward and away from one another in the direction of the double arrow S relative to the frame 4. It is also contemplated, however, to arrange one of the carriers fixed on the frame 4 and to move the remaining carriers 6 toward and away from the fixed carrier.

In the embodiment shown, carriers 6.1 to 6.3 are driven together by a common driving assembly, for example, comprising pneumatic cylinders 8 and transfer joints 9. In accordance with an exemplary embodiment, carriers 6.1 to 6.3 can be driven by one or more first pneumatic cylinders 8.1 and carriers 6.4 to 6.6 can be driven by one or more second pneumatic cylinders 8.2. Reference is now made to FIGS. 3-4, wherein one portion of gripper device comprising a first pneumatic cylinder 8.1 and three carriers 6.1 to 6.3 are shown. One of ordinary skill in the art would appreciate that the relationship of a second pneumatic cylinder 8.2 with respect to carriers 6.4 to 6.6 is substantially similar to, more specifically, a mirror image of, the relationship between the first pneumatic cylinder 8.1 and carriers 6.1 to 6.3.

Preferably transfer joints 9 can be utilized to displace gripper groups 5.1 to 5.6 and/or carrier 6.1 to 6.6 by a distance W from a first position to a second position. In the embodiment shown in FIGS. 3-4, carrier 6.1 can be displaced a distance $W_1$, carrier 6.2 can be displaced a distance $W_2$, and carrier 6.3 can be displaced a distance $W_3$, wherein $W_1$ and $W_2$ and $W_3$ are not equivalent. Rather, in the embodiment shown, $W_1>W_2>W_3$. Preferably, the spacing A between each adjacent carrier 6 in a first position is equivalent. More preferably, when carriers 6 are displaced to a second position, a second spacing B exists between the carriers 6. In accordance with a preferred embodiment, second spacing B between each pair of adjacent carriers 6 are equivalent. Therefore, it may be preferable for each carrier 6 to be displaced a distance W different from the adjacent carrier 6.

FIGS. 3-4 illustrate an embodiment having a movement translation or coupling assembly 10 having two coupling elements 10.1 and 10.2. Coupling elements 10.1 and 10.2 preferably varies distance W by which the carriers 6 are displaced.

In the embodiment shown, transfer joint 9 includes lever gears which include at least one, preferably two links per carrier. As shown, carrier 6.1 can be connected to links 9.1 and 9.2, carrier 6.2 can be connected to links 9.3 and 9.4, and carrier 6.3 can be connected to links 9.5 and 9.6. Preferably, links 9.1 to 9.6 are connected to first swivel points 11 on the frame 4 and also connected to second swivel points 12 on the carriers 6. The two links connected to a common carrier 6 are preferably substantially parallel to each other and preferably have equal lengths. The distance between first swivel point 11 and second swivel point 12 on a link 9.1 to 9.6 are preferably equivalent for each of the links 9.1 to 9.6 and for all carriers 6. Therefore, each of the carriers 6 can preferably be displaced about the first and second swivel points 11, 12 of the corresponding links 9.1 to 9.6, thus providing displacement in a parallel motion.

An exemplary embodiment of the first pneumatic cylinder 8.1 of the drive 7 can be joined to a carrier 6, preferably a median or central carrier, such as carrier 6.2 in FIGS. 3-4. As shown, link 9.3 can have an extension which extends beyond the first swivel point 11.3 on the frame 4 so that the link 9.3 forms a double-sided lever. The first pneumatic cylinder 8.1 can be connected via a swivel point 8a to the link 9.3 and can swivel link 9.3 about the swivel point 11.3 to displace carrier 6.2 for a direct swivel drive of the carrier 6.2.

Carrier 6.2 is directly driven by first pneumatic cylinder 8.1 and is preferably joined to two other carriers, carrier 6.1 and carrier 6.3, for a transfer of movement, such that all three carriers 6.1, 6.2, 6.3 can be displaced, more preferably swiveled by the first pneumatic cylinder 8.1. The carriers 6.1 to 6.3 can be connected to carrier 6.2 via coupling elements 10.1 and 10.2, which can connect the carrier 6.2 to one of the adjacent carriers. In the embodiment shown, for example, coupling element 10.1 connects carrier 6.2 to carrier 6.1, and coupling element 10.2 connects carrier 6.2 to carrier 6.3.

Coupling element 10.1 can be connected via the swivel point 12.3 to carrier 6.2 and via a coupling point 13 to the adjacent link 9.2 of the adjacent carrier 6.1. Coupling element 10.2 can be swiveled about swivel point 12.5 of the other adjacent carrier 6.3 and is coupled via a coupling point 14 on the adjacent link 9.4 of the driven carrier 6.2.

Preferably, coupling points 13, 14 are positioned with respect to swivel points 11.2, 11.4 of links 9.2, 9.4 to determine the displacement W of the connected carrier 6.1, 6.3 when the first pneumatic cylinder 8.1 moves the carrier 6.2. In the exemplary embodiment shown, coupling point 13 of the coupling element 10.1 along the link 9.2 is located at a distance x from the swivel point 11.2 of link 9.2. Coupling point 14 in the embodiment shown is located at a distance y from the swivel point 11.4 of link 9.4. In the exemplary embodiment shown, distance x is greater than distance y, and the same angular swivel of link 9.3 can result in the coupling point 12 traveling a longer path about the swivel point 11.2 than the distance coupling point 14 travels about the swivel point 11.4. Therefore, carrier 6.1 travels a longer path than carrier 6.2, and carrier 6.3 travels a shorter path than the carrier 6.2.

In accordance with a preferred embodiment of the invention which provides a common spacing A and B between the carriers 6 at the first and second positions, respectively, the paths traveled by the carriers 6.1, 6.2, and 6.3 can have a ratio of about 5:3:1. For example, if carrier 6.3 is displaced a certain distance when the first pneumatic cylinder 8.1 is displaced from the right most position as illustrated in FIG. 3 to the left most position as illustrated in FIG. 4, the carrier 6.2 is displaced a distance three times the displacement of carrier 6.3, and carrier 6.1 is displaced a distance five times the displacement of carrier 6.3. In accordance with an exemplary embodiment of the invention. The distance of displacement of carrier 6.3 is half the difference between A and B.

The construction and arrangement of pneumatic cylinders 8, transfer joint 9 and/or coupling assembly 10 are preferably such that the height of carriers 6 above conveyor lanes 3 at both the first and second positions are substantially the same. More preferably, the construction and arrangement provide carriers 6 to move between spacings A and B symmetrically about their zero position defined by the force of gravity. One example by which this can be achieved includes varyingly large dimensioned initial deviation. The difference in height of the carriers 6 resulting from the varying distances W traveled can be compensated by varying component heights, such as the height of grippers 5. For example, the height of grippers 5 can be varied as necessary such that the grippers 5 are aligned and positioned substantially parallel to the conveying plane.

In accordance with a preferred embodiment of the invention, a plurality of objects (not shown) are supported on the conveyor lanes 3 and can be picked up from a conveying system, the objects being spaced apart at a spacing A'. The carriers 6 preferably have a spacing of A between adjacent carriers to correspond to the spacing A' between the objects. The gripper device 1 is preferably constructed arranged such that gripper groups 5.1 to 5.6 are positioned above the conveyor lanes 3.1 to 3.6 and above the objects thereon. The grippers 5 can be lowered onto the objects whereupon the grippers 5 can grasp the objects.

The grippers 5 can then be raised, thus lifting the objects off the conveyor lanes 3. The gripper device 1 is preferably moved away from conveying lanes 3, preferably horizontally in direction H transverse to the conveying direction F, to remove the objects from the conveying system 2. If the objects are to maintain the spacing A, the objects are moved to a receiving area and deposited and remains spaced at spacing A.

If the objects removed from the conveyor lanes 3 are to be placed with a smaller spacing than spacing A, such as spacing B, drive 7 can be actuated. The pneumatic cylinders 8 can be moved to the position illustrated in FIG. 4 such that gripper groups 5.1 to 5.6 are moved toward each other along the longitudinal central plane of the gripper device 1 until adjacent gripper groups 5.1 to 5.6 have a spacing of B, where B is less than A. If the objects are to be placed with a different spacing, the pneumatic cylinders 8 can be displaced accordingly to obtain the desired spacing between the carriers 6 and thus the objects. In accordance with one embodiment, the spacing between the carriers 6 can be eliminated entirely. Preferably, when the spacing between the carriers 6 is eliminated, the spacing between grippers 5 of adjacent gripper groups 5.1 to 5.6 along the longitudinal central plane of the gripper device 1 can be spacing a, which is equivalent to the spacing between adjacent grippers 5 in a common gripper group 5.1 to 5.6.

Once the desired spacing between objects is obtained, and the objects are located above the receiving area, the objects can be deposited. For example, the objects can be deposited in an outer packaging. Once the objects are released, the gripper device 1 preferably moves toward and above conveyor lanes 3 and the spacing between the carriers is increased to A to align with the spacing of the conveyor lanes 3.

The examples provided are merely exemplary, as a matter of application specific to design choice, and should not be construed to limit the scope of the invention in any way.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. For example, the spacing between all the grippers transverse to the conveying direction can be varied, for example, if each gripper group includes a single gripper or a single row of grippers without deviating from the scope of the invention as a matter of application specific to design choice. Additionally, other alterations can be made, as a way of non-limiting example, the gripper device 1 can be adapted to various tasks, and whereas suction heads are described herein, various types and constructions of grippers can be used as a matter of application specific to design choice, without deviating from the scope of the invention. Moreover, a controller can be provided through which spacing A, B, or various intermediate spacings between A and B can be set. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. An apparatus for transporting objects, the apparatus comprising:
    a plurality of grippers connected to a plurality of carrier assemblies, wherein the carrier assemblies have a first carrier spacing substantially equivalent to a spacing between the objects, the carrier assemblies also having a second carrier spacing different from the first carrier spacing; a drive mechanism constructed and arranged to displace the carrier assemblies;
    a coupling assembly, the coupling assembly having one or more coupling elements capable of selectively connecting a carrier assembly to an adjacent carrier assembly;
    a link associated with a carrier assembly, the link being connected to, and selectively displaceable by, the drive mechanism, wherein displacement of the link displaces the carrier assembly from the first carrier spacing to the second carrier spacing; and
    a transfer joint, the transfer joint having one or more first links associated with a first carrier assembly and one or more second links associated with a second carrier assembly, wherein the one or more first links and the one or more second links are constructed and arranged such that displacement of the link by the drive mechanism results in the displacement of the one or more first links that displace the first carrier assembly a first distance, and the displacement of the one or more second links that displace the second carrier assembly a second distance different from the first distance.

2. The apparatus of claim 1, wherein the transfer joint includes a lever gear.

3. The apparatus of claim 1, wherein one of the carrier assemblies includes a plurality of grippers having a third spacing.

4. The apparatus of claim 1, wherein the carrier assemblies are arranged in at least one row, wherein a row of carrier assemblies can be displaced simultaneously.

5. The apparatus of claim 1, wherein each carrier assembly is connected to one gripper.

* * * * *

UNITED STATES PATENT AND TRADEMARK OFFICE
CERTIFICATE OF CORRECTION

PATENT NO. : 7,690,706 B2
APPLICATION NO. : 11/782500
DATED : April 6, 2010
INVENTOR(S) : Hans-Peter Wild, Eberhard Kraft and Frank Lechert It is certified that error appears in the above-identified patent and that said Letters Patent is hereby corrected as shown below:

Cover Page:
Change the following item:

"(73) Assignee: INDAG Gesellschaft für Industriebedarf mbH & Co. Betriebs, Eppelheim (DE)"

to

--73) Assignee: INDAG Gesellschaft für Industriebedarf mbH & Co. Betriebs KG, Eppelheim (DE)--.

Signed and Sealed this
Eighteenth Day of September, 2012

David J. Kappos
*Director of the United States Patent and Trademark Office*